United States Patent
Isitman et al.

(10) Patent No.: US 10,821,777 B2
(45) Date of Patent: Nov. 3, 2020

(54) TIRE WITH TREAD TO PROMOTE WET TRACTION AND REDUCE ROLLING RESISTANCE

(71) Applicant: The Goodyear Tire & Rubber Company, Akron, OH (US)

(72) Inventors: Nihat Ali Isitman, Hudson, OH (US); Paul Harry Sandstrom, Cuyahoga Falls, OH (US); Luisa Fernanda Munoz Mejia, Troine (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 198 days.

(21) Appl. No.: 15/847,025

(22) Filed: Dec. 19, 2017

(65) Prior Publication Data

US 2019/0184744 A1    Jun. 20, 2019

(51) Int. Cl.
| | | |
|---|---|---|
| *B60C 1/00* | (2006.01) | |
| *C08L 7/00* | (2006.01) | |
| *C08L 9/00* | (2006.01) | |

(52) U.S. Cl.
CPC .............. *B60C 1/0016* (2013.01); *C08L 7/00* (2013.01); *C08L 9/00* (2013.01); *C08L 2205/025* (2013.01); *C08L 2205/03* (2013.01); *C08L 2205/035* (2013.01); *C08L 2205/06* (2013.01)

(58) Field of Classification Search
CPC .................................................... B60C 1/0016
See application file for complete search history.

(56) References Cited

U.S. PATENT DOCUMENTS

| | | | |
|---|---|---|---|
| 6,350,807 B1 | 2/2002 | Blok et al. | |
| 9,550,893 B2 | 1/2017 | Francik et al. | C08L 25/10 |
| 9,757,987 B2 | 9/2017 | Jacoby et al. | B60C 11/00 |
| 2016/0159157 A1* | 6/2016 | Jacoby | B60C 11/005 |
| | | | 152/450 |
| 2016/0264768 A1* | 9/2016 | Francik | C08K 3/04 |

FOREIGN PATENT DOCUMENTS

EP    0796893 A1    9/1997

OTHER PUBLICATIONS

European Search Report for Application No. 18213316.5 dated May 31, 2019.

* cited by examiner

*Primary Examiner* — Megan McCulley
(74) *Attorney, Agent, or Firm* — John D. DeLong; Henry C. Young

(57) ABSTRACT

This invention relates to a tire with a tread of a rubber composition for promoting a combination of beneficial wet traction and reduced rolling resistance, while limiting any loss of winter traction at low temperatures. The tread rubber composition contains a combination of high and lower glass transition temperature (Tg) elastomers. Its reinforcing filler is primarily precipitated silica. The high Tg elastomer is comprised of synthetic high vinyl polybutadiene rubber and the lower Tg elastomer is comprised of at least one of natural and synthetic cis 1,4-polyisoprene rubber. The tread rubber composition may contain at least one of vegetable oil based rubber processing aid and traction promoting resin. The tread rubber composition is intended to be exclusive of styrene-containing elastomers.

18 Claims, No Drawings

TIRE WITH TREAD TO PROMOTE WET TRACTION AND REDUCE ROLLING RESISTANCE

FIELD OF THE INVENTION

This invention relates to a tire with a tread of a rubber composition for promoting a combination of beneficial wet traction and reduced rolling resistance, while limiting any loss of winter traction at low temperatures. The tread rubber composition contains a combination of high and lower glass transition temperature (Tg) elastomers. Its reinforcing filler is primarily precipitated silica. The high Tg elastomer is comprised of synthetic high vinyl polybutadiene rubber and the lower Tg elastomer is comprised of at least one of natural and synthetic cis 1,4-polyisoprene rubber. The tread rubber composition may contain at least one of vegetable oil based rubber processing aid and traction promoting resin. The tread rubber composition is intended to be exclusive of styrene-containing elastomers.

BACKGROUND OF THE INVENTION

Tires are sometimes desired with treads for promoting a combination of both traction on wet surfaces and beneficially reduced rolling resistance. Various rubber compositions may be proposed for such tire treads. It is also a desirable feature of such tires to have minimum or no loss of winter traction performance.

Wet Traction

To promote wet traction, namely traction of the tire tread running surface on wet road surfaces, a tire tread rubber composition may, for example, contain a high Tg (high glass transition temperature) diene based synthetic elastomer. Its rubber reinforcing filler may primarily be precipitated silica together with a silica coupler to aid in coupling the precipitated silica to the diene-based elastomer(s). Such tire tread rubber may be considered as being precipitated silica rich.

In one aspect, predictive improvement of wet traction performance (increase in the tread's wet traction) for the tread rubber composition may be based on at least one of maximization of its tan delta physical property value at about 0° C. and minimization of its rebound physical property value at about 0° C.

Rolling Resistance

Reducing rolling resistance for a tire can relate to reducing energy based hysteresis (promoting a reduction in the rubber composition's hysteresis) for the tire's tread rubber composition which promotes a reduction in internal heat generation for the cured rubber composition with an attendant reduction in temperature increase during tire tread service and predictive improved (reduced) rolling resistance for the tire with a resultant beneficially better (improved) fuel economy for an associated vehicle. In one aspect, improved (lower) hysteresis for a cured rubber composition can be based on at least one of minimizing its tan delta physical property value at about 100° C. and maximizing its rebound physical property value at about 100° C.

Winter Performance

Promoting cold weather (winter) performance for a tire can relate to providing a rubber composition for its tread having a lower stiffness at lower ambient temperatures which may be indicated by a lower storage modulus (G') value at a cold temperature for the rubber composition. A predictive promotion of cold weather performance for the tread rubber composition may be based on a minimization of its stiffness physical property, for example minimizing its storage modulus (G') property, at a temperature of about −20° C. This may present a challenge for a tire tread rubber which is based upon promoting beneficially wet traction and reduction of hysteresis by providing its rubber composition with a high Tg elastomer with reinforcing filler being primarily precipitated silica where it might be expected that it could become stiffer (having a higher G' property) at cold ambient temperatures and thereby a reduction in cold weather performance, which may include vehicular driving conditions through snow covered road conditions.

Therefore, it is desirable to evaluate providing such vehicular tire tread with a rubber composition containing a combination of both high and lower Tg elastomers with (A) an optimized (maximized) tan delta property at about 0° C. and an optimized (minimized) rebound value at about 0° C. (for promoting predictive wet traction performance), (B) an optimized (minimized) tan delta value at about 100° C. and a maximized rebound value at about 100° C. (for promoting predictive hysteresis reduction for the rubber composition and associated beneficial reduced rolling resistance for the tire), and (C) an optimized (minimized) stiffness property at about −20° C. (for promotion of predictive beneficial cold weather performance).

It is considered that significant challenges are presented for providing such tire tread rubber compositions that promote a combination of both good wet traction and beneficially reduced hysteresis (and associated beneficial reduction in associated tire rolling resistance) while limiting loss of (substantially maintaining) winter traction at low ambient temperatures. To achieve the challenge of promoting such balance of tread rubber performances with tread rubber compositions, it is recognized that concessions and adjustments would be expected.

To meet such challenge, it is desired to evaluate providing a tread rubber composition utilizing (containing) a combination of:

(A) high vinyl polybutadiene rubber with a high Tg, (B) lower Tg (lower than the high vinyl polybutadiene rubber's Tg) natural and/or synthetic cis 1,4-polyisoprene rubber, (C) traction promoting resin to promote wet traction, (D) at least one of reinforcing filler containing a high content of precipitated silica to promote wet traction, and (E) an inclusion of rubber processing oil comprised at least one of petroleum based rubber processing oil and vegetable triglyceride rubber processing oil.

In the description of this invention, the terms "compounded" rubber compositions and "compounds" are used to refer to rubber compositions which have been compounded, or blended, with appropriate rubber compounding ingredients. The terms "rubber" and "elastomer" may be used interchangeably unless otherwise indicated. The amounts of materials are usually expressed in parts of material per 100 parts of rubber by weight (phr).

The glass transition temperature (Tg) of the elastomers may be determined by DSC (differential scanning calorimetry) measurements at a temperature rising rate of about 10° C. per minute, as would be understood and well known by one having skill in such art. The softening point of a resin may be determined by ASTM E28 which might sometimes be referred to as a ring and ball softening point.

SUMMARY AND PRACTICE OF THE INVENTION

In accordance with this invention, a pneumatic tire is provided having a circumferential rubber tread, adapted to be ground-contacting, where said tread is a rubber composition comprised of (containing), based on parts by weight per 100 parts by weight elastomer (phr):

(A) 100 phr of conjugated diene-based elastomers, exclusive of styrene containing elastomer and exclusive of polybutadiene elastomer having a vinyl 1,2-content in a range of from 15 to 60 percent, comprised of;

(1) about 10 to about 75, alternately about 30 to about 70, and alternately about 10 to about 60, phr of a high vinyl polybutadiene rubber having a Tg in a range of from about −40° C. to about −10° C. and an isomeric vinyl 1,2-content in a range of about 60 to about 85 percent, and (2) about 90 to about 25, alternately about 70 to about 30, and alternately about 90 to about 40, phr of a cis 1,4-polyisoprene rubber (natural or synthetic, desirably natural) having a Tg in a range of about −65° C. to about −75° C. and an isomeric cis 1,4-content of at least 95 percent, (B) about 80 to about 200, alternately from about 100 to about 160, phr of rubber reinforcing filler comprised of a combination of precipitated silica (amorphous synthetic precipitated silica) and rubber reinforcing carbon black in a ratio of precipitated silica to rubber reinforcing carbon black of at least 9/1, together with a silica coupling agent having a moiety reactive with hydroxyl groups (e.g. silanol groups) on said precipitated silica and another different moiety interactive with said diene-based elastomers, and (C) about 10 to about 60, alternately from about 10 to about 40, phr of at least one added ingredient (additive) comprised of, and any combination of:

(1) traction promoting resin (e.g. traction between the running surface of the tread and ground), (2) petroleum based rubber processing oil, and (3) vegetable triglyceride oil (as a rubber processing oil).

In one embodiment, said vegetable triglyceride oil is comprised of, for example and not intended to be limiting, at least one of sunflower, soybean, canola and safflower oil, usually desirably primarily at least one of sunflower and soybean oil.

In one embodiment, said traction promoting resin is comprised of at least one of styrene/alphamethylstyrene resin, coumarone-indene resin, petroleum hydrocarbon resin, terpene polymer, terpene phenol resin, rosin derived resin and copolymers thereof. Said resins desirably have a softening point (ASTM E28) within a range of from about 60° C. to about 150° C.

In one embodiment, said petroleum based rubber processing oil may be comprised of (may contain) at least one of naphthenic, paraffinic and aromatic oils.

In one embodiment, said rubber processing oil is exclusively vegetable triglyceride oil.

In one embodiment, said rubber processing oil is exclusively petroleum based rubber processing oil.

In one embodiment, said rubber processing oil is a combination of petroleum based rubber processing oil and vegetable triglyceride oil.

In one embodiment, the Tg's of said high vinyl polybutadiene rubber and said cis 1,4-polyisoprene rubber are spaced apart by at least 25° C.

In additional accordance with this invention, said tread rubber composition is exclusive of styrene containing elastomers including styrene/butadiene elastomers.

In further accordance with this invention, said tire tread is provided as a sulfur cured rubber composition.

In one embodiment, said tread rubber composition further contains up to 25, alternately about 1 to about 15, phr of at least one additional diene based elastomer exclusive of styrene containing elastomers and desirably exclusive of synthetic copolymer based elastomers (elastomers as copolymers comprised of at least two diene monomers which are different diene monomers from each other). Such additional elastomer may be comprised of, for example, at least one of a low vinyl polybutadiene rubber (vinyl 1,2-content of less than 15 percent) having a Tg in a range of from about −108° C. to about −90° C. and 3,4-polyisoprene.

In one embodiment, said high vinyl polybutadiene elastomer may be a functionalized high vinyl polybutadiene elastomer comprised of a high vinyl polybutadiene elastomer end-chain functionalized with at least one functional group reactive with hydroxyl groups contained on said precipitated silica. Representative of such end-chain functional groups (terminal groups) may be, for example, at least one of amine (e.g. primary and/or secondary amine groups), thiol, siloxy (e.g. alkoxysilane) and silane-sulfide groups which are reactive with hydroxyl groups on said precipitated silica, and which may be found, for example, in U.S. Pat. Nos. 9,550,893 and 9,757,987.

In one embodiment, said precipitated silica and silica coupling agent may be pre-reacted to form a composite thereof prior to addition to the rubber composition. In such embodiment, said precipitated silica and silica coupling agent are provided as a composite of precipitated silica pre-reacted with silica coupling agent.

In one embodiment, said precipitated silica and silica coupling agent may be added to the rubber composition and thereby reacted together in situ within the rubber composition.

The traction promoting resin is desirably comprised of at least one of styrene/alphamethylstyrene resin, coumarone-indene resin, petroleum hydrocarbon resin, terpene polymer, terpene phenol resin and rosin based resin, including rosin derivatives and copolymers thereof.

In one embodiment, the resin is a styrene/alphamethylstyrene resin. Such styrene/alphamethylstyrene resin may be, for example, a relatively short chain copolymer of styrene and alphamethylstyrene. In one embodiment, such a resin may be suitably prepared, for example, by cationic copolymerization of styrene and alphamethylstyrene in a hydrocarbon solvent. The styrene/alphamethylstyrene resin may have, for example, a styrene content within a range of from about 10 to about 90 percent. The styrene/alphamethylstyrene resin may have a softening point, for example, in a range of from about 60° C. to about 125° C., alternately from about 80° C. to 90° C. (ASTM E28). A suitable styrene/alphamethylstyrene resin may be, for example, Resin 2336™ from Eastman or Sylvares SA85™ from Arizona Chemical.

In one embodiment, the resin is a coumarone-indene resin. Such coumarone-indene resin may have a softening point, for example, in a range of from about 60° C. to about 150° C. containing coumarone and indene as the monomer components making up the resin skeleton (main chain). Minor amounts of monomers other than coumarone and indene may be incorporated into the coumarone-indene skeleton such as, for example, methyl coumarone, styrene, alphamethylstyrene, methylindene, vinyltoluene, dicyclopentadiene, cycopentadiene, and diolefins such as isoprene and piperylene.

In one embodiment, the resin is a petroleum hydrocarbon resin. Such petroleum hydrocarbon resin may be, for example, an aromatic and/or non-aromatic (e.g. paraffinic) based resin. Various petroleum resins are available. Some petroleum hydrocarbon resins have a low degree of unsaturation and high aromatic content, whereas some are highly unsaturated and yet some contain no aromatic structure at all. Differences in the resins are largely due to the olefins contained in the petroleum based feedstock from which the resins are derived. Conventional olefins for such resins include any C5 olefins (olefins and di-olefins containing an average of five carbon atoms) such as, for example, cyclopentadiene, dicyclopentadiene, isoprene and piperylene, and any C9 olefins (olefins and diolefins containing an average of nine carbon atoms) such as, for example, vinyltoluene and alphamethylstyrene. Such resins may be made from mixtures of such C5 and C9 olefins.

In one embodiment, said resin is a terpene resin. Such resin may be comprised of, for example, polymers of at least one of limonene, alpha pinene, beta pinene or delta-3-carene and having a softening point in a range of from about 60° C. to about 160° C. Such terpene resin may be, for example, available as Sylvatraxx 4150™.

In one embodiment, the resin is a terpene-phenol resin. Such terpene-phenol resin may be a comprised of a copolymer of phenolic monomer with a terpene such as, for example, limonene and pinene.

In one embodiment, the resin is a resin derived from rosin (rosin based resin) and derivatives thereof. Representative thereof are, for example, gum rosin and wood rosin which are well known rosins. Gum rosin and wood rosin have similar compositions, although the amount of components of the rosins may vary. Such resins may be in the form of esters of rosin acids and polyols such as pentaerythritol or glycol. In one embodiment, the rosin may be at least partially hydrogenated.

The precipitated silica reinforcement may, for example, be characterized by having a BET surface area, as measured using nitrogen gas, in the range of, for example, about 40 to about 600, and more usually in a range of about 50 to about 300 square meters per gram. The BET method of measuring surface area might be described, for example, in the *Journal of the American Chemical Society*, Volume 60, as well as ASTM D3037.

Such precipitated silicas may, for example, also be characterized by having a dibutylphthalate (DBP) absorption value, for example, in a range of about 100 to about 400, and more usually about 150 to about 300 cc/100 g.

Various commercially available precipitated silicas may be used, such as for example, and not intended to be limiting, silicas from PPG Industries under the Hi-Sil trademark with designations 210, 243, 315, etc.; silicas from Solvay with, for example, designations of Zeosil 1165MP™ and Zeosil 165GR™; silicas from Evonik with, for example, designations VN2 and VN3; and chemically treated (pre-hydrophobated) precipitated silicas such as for example Agilon™ 400 from PPG.

Representative examples of rubber reinforcing carbon blacks are, for example, and not intended to be limiting, are referenced in *The Vanderbilt Rubber Handbook*, 13th edition, year 1990, on Pages 417 and 418 with their ASTM designations. As indicated, such rubber reinforcing carbon blacks may have iodine absorptions ranging from, for example, 60 to 240 g/kg and DBP values ranging from 34 to 150 cc/100 g.

Representative of silica coupling agents for the precipitated silica are comprised of, for example;
(A) bis(3-trialkoxysilylalkyl) polysulfide containing an average in range of from about 2 to about 4, alternatively from about 2 to about 2.6 or from about 3.2 to about 3.8, connecting sulfur atoms in its polysulfide bridge, or
(B) an organoalkoxymercaptosilane, or
(C) their combination.

Representative of such bis(3-trialkoxysilylalkyl) polysulfide is comprised of bis(3-triethoxysilylpropyl) polysulfide.

It is readily understood by those having skill in the art that the vulcanizable rubber composition would be compounded by methods generally known in the rubber compounding art. In addition, said compositions could also contain fatty acid, zinc oxide, waxes, antioxidants, antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. Usually it is desired that the sulfur-vulcanizing agent is elemental sulfur. The sulfur-vulcanizing agent may be used in an amount ranging, for example, from about 0.5 to 8 phr, with a range of from 1.2 to 6 phr being often more desirable. Typical amounts of processing aids for the rubber composition, where used, may comprise, for example, from about 1 to about 10 phr. Typical processing aids may be, for example, at least one of various fatty acids (e.g. at least one of palmitic, stearic and oleic acids) or fatty acid salts.

Rubber processing oils may be used as indicated, which may be petroleum based and/or vegetable triglyceride oil. Such oils may be provided as an extending oil present in the elastomers and/or provided as a freely added oil during the compounding of the rubber composition. Suitable petroleum based process oils include various oils as are known in the art, including aromatic, paraffinic, naphthenic, and low PCA oils, such as MES, TDAE, and heavy naphthenic oils, suitable vegetable triglyceride oils such may include, for example and not intended to be limiting, sunflower, soybean, canola and safflower oils.

Typical amounts of antioxidants may comprise, for example, about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants may comprise, for example, about 1 to 5 phr. Typical amounts of fatty acids, if used, which can include stearic acid comprise about 0.5 to about 5 phr. Typical amounts of zinc oxide may comprise, for example, about 2 to about 5 phr. Typical amounts of waxes comprise about 1 to about 5 phr. Often microcrystalline waxes are used. Typical amounts of peptizers, when used, may be used in amounts of, for example, about 0.1 to about 1 phr. Typical peptizers may be, for example, pentachlorothiophenol and dibenzamidodiphenyl disulfide.

Sulfur vulcanization accelerators are used to control the time and/or temperature required for vulcanization and to improve the properties of the vulcanizate. In one embodiment, a single accelerator system may be used, i.e., primary accelerator. The primary accelerator(s) may be used in total amounts ranging, for example, from about 0.5 to about 4, sometimes desirably about 0.8 to about 2.5, phr. In another embodiment, combinations of a primary and a secondary accelerator might be used with the secondary accelerator being used in smaller amounts, such as, for example, from about 0.05 to about 4 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, sulfenamides, and xanthates. Often desirably the primary accelerator is a sulfenamide. If a second accelerator is used, the secondary accelerator is often desirably a guanidine such as for example a diphenylguanidine.

The mixing of the vulcanizable rubber composition can be accomplished by methods known to those having skill in the rubber mixing art. For example, the ingredients are typically mixed in at least two stages, namely at least one non-productive stage followed by a productive mix stage. The curatives, including sulfur-vulcanizing agents, are typically mixed in the final stage which is conventionally called the "productive" mix stage in which the mixing typically occurs at a temperature, or ultimate temperature, lower than the mix temperature(s) of the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, the thermomechanical working may be from 1 to 20 minutes.

The pneumatic tire of the present invention may be, for example, a passenger tire, truck tire, a race tire, aircraft tire, agricultural tire, earthmover tire and off-the-road tire. Usually desirably the tire is a passenger or truck tire. The tire may also be a radial or bias ply tire, with a radial ply tire being usually desired.

Vulcanization of the pneumatic tire containing the tire tread of the present invention is generally carried out at conventional temperatures in a range of, for example, from about 140° C. to 200° C. Often it is desired that the vulcanization is conducted at temperatures ranging from about 150° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

The following examples are presented for the purpose of illustrating and not limiting the present invention. The parts and percentages are parts by weight, usually parts by weight per 100 parts by weight rubber (phr) unless otherwise indicated.

EXAMPLE I

Exemplary rubber compositions were prepared for their evaluation as potential tire treads to promote a combination of wet traction and reduced rubber hysteresis with associated predicted beneficial reduction in tire rolling resistance, while limiting any loss of winter traction at low ambient temperatures. The general formulation for the rubber compositions is illustrated in the following Table 1.

The rubber Samples were prepared by blending the ingredients, other than the sulfur curatives, in at least one sequential non-productive mixing stage (NP) in an internal rubber mixer for about 4 minutes to a temperature of about 160° C. The resulting mixtures were subsequently individually mixed in a final productive mixing stage (P) in an internal rubber mixer with the sulfur curatives comprised of the sulfur and sulfur cure accelerators for about 2 minutes to a temperature of about 110° C. The rubber compositions were removed from the internal rubber mixer after each mixing step and cooled to below 40° C. between each individual non-productive mixing stage and before the final productive mixing stage.

TABLE 1

| Material | Parts by weight |
| --- | --- |
| Non-Productive Mixing Steps (NP's) - Mixed to about 160° C. | |
| Natural cis 1,4-polyisoprene rubber[1] | 50 |
| High cis 1,4-polybutadiene rubber (low vinyl)[2] | 50 and 0 |
| High vinyl polybutadiene rubber[3] | 0 and 50 |
| Petroleum based rubber processing oil | 0, 25 and 50 |
| Vegetable triglyceride (sunflower) oil[4] | 0, 25 and 50 |
| Traction promoting resin[5] | 0 and 25 |
| Precipitated silica[6] | 100 |
| Silica coupler[7] | 6 |
| Fatty acids[8] | 3 |
| Antioxidants and paraffinic and microcrystalline waxes[9] | 4.5 |
| Zinc oxide | 2.5 |
| Productive Mixing Step (P) to about 110° C. | |
| Sulfur | 1.6 |
| Sulfur cure accelerators[8] | 3.6 |

[1]Natural cis 1,4-polyisoprene rubber having a Tg of about −70° C. (TSR 20)

[2]Cis 1,4-polybutadiene rubber having a cis 1,4-content of at least 95 percent as BUD1223 ™ from The Goodyear Tire & Rubber Company and having a low vinyl 1,2-content of less than 15 percent

[3]High vinyl polybutadiene rubber having a vinyl content of about 77 percent and a Tg of about −30° C. as Europrene HV80 ™ from ENI Versalis Company

[4]Sunflower oil as Agripure AP65 ™ from Cargill Company as a vegetable triglyceride oil

[5]Traction promoting resin as polyterpene resin as Sylvatraxx 4150 ™ from Arizona Chemical company having a softening point of about 115° C.

[6]Precipitated silica as HiSil 315 ™ from PPG having an average surface area (CTAB) of about 125 m²/g

[7]Silica coupler as Si266 ™ from Evonik as a bis(3-triethoxysilylpropyl) polysulfide having an average of from about 2 to about 2.6 connecting sulfur atoms in its polysulfidic bridge

[8]Mixture of fatty acids comprised of stearic, palmitic and oleic acids

[9]Sulfur vulcanization accelerators as sulfenamide and diphenylguanidine

EXAMPLE II

In this Example, exemplary rubber compositions were prepared for evaluation for use as a tire tread to promote a combination of improved wet traction and beneficially reduced rubber hysteresis (with associated predictive beneficially reduced associated tire rolling resistance) with a minimum effect on cold weather (winter) performance.

A Control rubber composition was prepared and identified as Control rubber Sample A as a precipitated silica reinforced rubber composition containing elastomers as a combination of natural cis 1,4-polyisoprene rubber and synthetic cis 1,4-polybutadiene rubber.

An Experimental rubber composition was prepared and identified as Experimental rubber Sample B containing the natural cis 1,4-polyisoprene and high vinyl polybutadiene elastomers.

The Control rubber Sample A and Experimental rubber Sample B compositions are based on the formulation exhibited in Table 1 with variable ingredients shown in the following Table 2.

TABLE 2

|  | Parts by Weight (phr) | |
| --- | --- | --- |
| Material | Control Sample A | Experimental Sample B |
| Natural cis 1,4-polyisoprene rubber | 50 | 50 |
| High cis 1,4-polybutadiene rubber | 50 | 0 |
| High vinyl polybutadiene rubber | 0 | 50 |
| Rubber processing oil (petroleum) | 50 | 50 |
| Vegetable oil | 0 | 0 |
| Traction promoting resin | 0 | 0 |

The following Table 3 illustrates various physical properties of rubber compositions based upon the basic formulation of Table 1 for Control rubber Sample A and Experimental rubber Sample B. Where cured rubber samples are reported, such as for the stress-strain, rebound, tan delta and storage modulus G' values, the rubber samples were cured for about 10 minutes at a temperature of about 170° C.

To establish the predictive wet traction, a tangent delta (tan delta) test and rebound test were run at 0° C.

To establish the predictive rolling resistance performance, a tangent delta (tan delta) test and rebound test were run at 100° C.

To establish the predictive low temperature (winter snow) performance, a stiffness test (storage modulus G') was run at −20° C. to provide a stiffness value of the compounds (rubber compositions) at lower operating temperatures.

EXAMPLES II THROUGH V FOR TAN DELTA AND REBOUND PROPERTIES AT 100° C.

(A) For the tan delta physical property, a Rubber Process Analyzer (RPA 2000), provided by Alpha Technology, was used. The RPA 2000 instrument and testing standards are reported by John Seza of Alpha Technology, Nov. 11, 1992, and by Palowski, et. al. in *Rubber & Plastics News* in April 26 and May 10, 1993. For the purpose of characterization of tan delta property for the cured rubber compositions, a frequency of 1 Hertz, strain value of 10 percent at test temperature of 100° C. was used by the RPA instrument.

(B) For the rebound property at 100° C. for the cured rubber compositions, a rebound resilience tester was used from Zwick™ Instruments.

EXAMPLES II THROUGH V FOR STIFFNESS (STORAGE MODULUS, G') AT −20° C. AND TAN DELTA PROPERTY AT 0° C.

The storage modulus (G') and tan delta physical properties may be determined by a Dynamic Mechanical Analyzer provided by Metravib™ Instruments. For the purpose of characterization of storage modulus (G') property and tan delta property for the cured rubber compositions, a frequency of 7.8 Hertz, strain value of 1.5 percent was used by the Metravib™ instrument.

TABLE 3

| Properties | Control Sample A | Experimental Sample B |
| --- | --- | --- |
| Wet Traction, Laboratory Prediction | | |
| Tan delta, 1.5% strain, 7.8 Hertz, 0° C. (higher is better) | 0.29 | 0.39 |
| Rebound, 0° C. (%), (lower is better) | 32 | 16 |
| Cold Weather (Winter) Performance (Stiffness) Laboratory Prediction | | |
| Storage modulus (G'), (MPa) at −20° C., 7.8 Hertz, 1.5% strain (lower stiffness values are better) | 8.7 | 10.8 |
| Rolling Resistance (RR), (Rubber Hysteresis) Laboratory Prediction | | |
| Rebound at 100° C., (%), (higher is better) | 59 | 64 |
| Tan delta, 10% strain, 1 Hertz (100° C.) (lower is better) | 0.18 | 0.13 |
| Additional properties | | |
| Tensile strength (MPa) | 17.7 | 16.6 |
| Elongation at break (%) | 692 | 536 |
| Modulus, 300% (MPa) | 5.7 | 7.7 |

(A) for Predictive Wet Traction (Tan Delta and Rebound Properties at 0° C.)

From Table 3 it is observed that the tan delta value at 0° C. of 0.39 for Experimental rubber Sample B containing the high vinyl polybutadiene rubber is significantly higher than the tan delta value of 0.29 for Control rubber Sample A containing the high cis 1,4-polybutadiene.

It is also observed that the rebound value at 0° C. of 16 percent for Experimental rubber Sample B is significantly lower than the rebound value at 0° C. of 32 percent for Control rubber Sample A containing the high cis 1,4-polybutadiene.

It is therefore concluded that it was discovered that replacing the high cis 1,4-polybutadiene rubber (therefore a low vinyl polybutadiene rubber) with the high vinyl polybutadiene rubber for the petroleum based rubber processing oil containing rubber composition resulted in a beneficially substantial improvement (increased) predictive wet traction for a tire with tread comprised of Experimental rubber Sample B.

(B) For Predictive Tire Rolling Resistance Based on Predictive Rubber Hysteresis (Based on Tan Delta and Rebound Properties at 100° C.)

From Table 3 it is observed that the tan delta value at 100° C. of 0.13 for Experimental rubber Sample B containing the high vinyl polybutadiene rubber is significantly lower than the tan delta value of 0.18 for Control rubber Sample A containing the high cis 1,4-polybutadiene.

It is also observed that the rebound value at 100° C. of 64 percent for Experimental rubber Sample B containing the high vinyl polybutadiene rubber is significantly higher than the rebound value at 100° C. of 59 percent for Control rubber Sample A containing the high cis 1,4-polybutadiene.

It is therefore concluded that it was discovered that replacing the high cis 1,4-polybutadiene rubber (therefore a low vinyl polybutadiene rubber) with the high vinyl polybutadiene rubber for the petroleum based rubber processing oil containing rubber composition resulted in a beneficially improved (decreased) hysteresis for the rubber composition B with an associated predictive improved (reduction) in tire rolling resistance for a tire with tread of rubber composition comprised of rubber composition B with a predictive improved fuel economy for an associated vehicle.

(C) For Predictive Cold Weather Performance (Stiffness at −20° C.)

From Table 3 it is observed that the storage modulus (G') value of 10.8 MPa at −20° C. for Experimental rubber Sample B containing the high vinyl polybutadiene rubber is somewhat higher than the storage modulus (G') of 8.7 MPa for Control rubber Sample A containing the high cis 1,4-polybutadiene instead of the high vinyl polybutadiene rubber.

It is concluded that it was discovered that replacing the high cis 1,4-polybutadiene rubber (therefore a low vinyl polybutadiene rubber) of Control rubber Sample A with the high vinyl polybutadiene rubber in Experimental rubber Sample B resulted in a somewhat higher stiffness at −20° C. and therefore a somewhat reduced predictive cold weather performance for a tire with tread of rubber composition of Sample B.

Summary of Results for Example II

Experimental rubber Sample B, when compared to Control rubber Sample A, would be predictive of the following tire performance when used as the tread compound: improved wet traction and rolling resistance, with a slight reduction of (therefore substantially maintaining) cold weather performance.

EXAMPLE III

In this Example, exemplary rubber compositions were prepared for evaluation for use as a tire tread to promote a combination of improved wet traction and rolling resistance with a minimum effect on cold weather (winter) performance.

A Control rubber composition was prepared and identified as Control rubber Sample C as a precipitated silica reinforced rubber composition containing elastomers as a combination of natural cis 1,4-polyisoprene rubber together with cis 1,4-polybutadiene rubber.

For this example, the rubber compositions contained petroleum rubber processing oil and traction promoting resin.

An Experimental rubber composition was prepared and identified as Experimental rubber Sample D which also contained the natural cis 1,4-polyisoprene together with high vinyl, high Tg, polybutadiene rubber.

The Control rubber Sample C and Experimental rubber Sample D compositions are based on the formulation exhibited in Table 1 with selected ingredients shown in the following Table 4.

TABLE 4

| | Parts by Weight (phr) | |
|---|---|---|
| Material | Control Sample C | Experimental Sample D |
| Natural cis 1,4-polyisoprene rubber | 50 | 50 |
| High cis 1,4-polybutadiene rubber | 50 | 0 |
| High vinyl polybutadiene rubber | 0 | 50 |
| Rubber processing oil (petroleum) | 25 | 25 |
| Traction promoting resin | 25 | 25 |
| Vegetable oil | 0 | 0 |

The following Table 5 illustrates various physical properties of Control rubber Sample C and Experimental rubber Sample D. Where cured rubber samples are reported, such as for the stress-strain, hot rebound and hardness values, the rubber samples were cured for about 10 minutes at a temperature of about 170° C.

To establish the predictive wet traction, a tangent delta (tan delta) test and rebound test were run at 0° C.

To establish the predictive rolling resistance performance, a tan delta test and rebound test were run at 100° C.

To establish the predictive low temperature (winter snow) performance, the rubber's stiffness test (storage modulus G') was run at −20° C. to provide a stiffness value of the compounds (rubber compositions) at lower operating temperatures.

TABLE 5

| Properties | Control Sample A | Experimental Sample B |
|---|---|---|
| Wet Traction, Laboratory Prediction | | |
| Tan delta, 1.5% strain, 7.8 Hertz, 0° C. (higher is better) | 0.37 | 0.54 |
| Rebound, 0° C. (%), (lower is better) | 18 | 8 |
| Cold Weather (Winter) Performance (Stiffness) Laboratory Prediction | | |
| Storage modulus (G'), (MPa) at −20° C., 7.8 Hertz, 1.5% strain (lower stiffness values are better) | 11.6 | 24.1 |
| Rolling Resistance (RR) Laboratory Prediction | | |
| Rebound at 100° C., (%), (higher is better) | 57 | 59 |
| Tan delta, 10% strain, 1 Hertz (100° C.) (lower is better) | 0.19 | 0.13 |
| Additional properties | | |
| Tensile strength (MPa) | 17.7 | 17.6 |
| Elongation at break (%) | 665 | 546 |
| Modulus 300% (MPa) | 6.3 | 7.9 |

(A) for Predictive Wet Traction (Tan Delta and Rebound Properties at 0° C.)

From Table 5 it is observed that the tan delta value at 0° C. of 0.54 for Experimental rubber Sample D containing the high vinyl polybutadiene rubber together with the traction promoting resin is significantly higher than the tan delta value of 0.37 for Control rubber Sample C containing the high cis 1,4-polybutadiene rubber.

It is also observed that the rebound value at 0° C. of eight percent for Experimental rubber Sample D is significantly lower than the rebound value at 0° C. of 18 percent for Control rubber Sample C containing the high cis 1,4-polybutadiene rubber.

It is therefore concluded that it was discovered that replacing the high cis 1,4-polybutadiene rubber (therefore a low vinyl polybutadiene rubber) with the high vinyl polybutadiene rubber for the traction promoting resin-containing rubber composition resulted in a beneficially substantially improved (increased) predictive wet traction for a tire with a tread comprised of Experimental rubber Sample D.

(B) For Predictive Tire Rolling Resistance (RR) Based on Predictive Rubber Hysteresis (Tan Delta and Rebound Properties at 100° C.)

From Table 5 it is observed that the tan delta value at 100° C. of 0.13 for Experimental rubber Sample D containing the high vinyl polybutadiene rubber together with the traction promoting resin is significantly lower than the tan delta value of 0.19 for Control rubber Sample C containing the high cis 1,4-polybutadiene.

It is also observed that the rebound value at 100° C. of 59 percent for Experimental rubber Sample D containing the high vinyl polybutadiene rubber is higher than the rebound value at 100° C. of 57 percent for Control rubber Sample C containing the high cis 1,4-polybutadiene.

It is therefore concluded that it was discovered that replacing the high cis 1,4-polybutadiene rubber (therefore a low vinyl polybutadiene rubber) with the high vinyl polybutadiene rubber-containing rubber composition, also containing the traction promoting resin, resulted in a beneficially improved (decreased) hysteresis for the rubber composition D and an associated predictive improved (reduction) in tire rolling resistance for a tire with tread of rubber composition comprised of rubber composition D with a predictive improved fuel economy for an associated vehicle.

(C) For Predictive Cold Weather Performance (Stiffness at −20° C.)

From Table 5 it is observed that the Storage modulus (G') at −20° C. value of 24.1 MPa for Experimental rubber Sample D containing the high vinyl polybutadiene rubber is significantly higher than the Storage modulus (G') of 11.6 MPa for Control rubber Sample C containing the high cis 1,4-polybutadiene rubber (therefore a low vinyl polybutadiene rubber).

It is concluded that it was discovered that replacing the high cis 1,4-polybutadiene rubber (low vinyl polybutadiene rubber) of traction promoting-containing Control rubber Sample C with the high vinyl polybutadiene rubber in Experimental rubber Sample D resulted in higher stiffness for the rubber composition and therefore a reduced predictive cold weather performance for a tire with tread of rubber composition of Sample D.

Summary of Results for Example III

Experimental rubber Sample D, when compared to Control rubber Sample C, would be predictive of the following tire performance when used as the tread compound: improved (increased) wet traction and improved (reduced) rolling resistance, with a reduction of cold weather performance.

EXAMPLE IV

In this Example, exemplary rubber compositions were prepared for evaluation for use as a tire tread to promote a combination of improved wet traction and rolling resistance with a minimum effect on cold weather (winter) performance.

A Control rubber composition was prepared and identified as Control rubber Sample E as a precipitated silica reinforced rubber composition containing elastomers as a combination of natural cis 1,4-polyisoprene rubber and cis 1,4-polybutadiene rubber.

An Experimental rubber composition was prepared and identified as Experimental rubber Sample F containing the natural cis 1,4-polyisoprene rubber together with high vinyl, high Tg, polybutadiene elastomer.

For this Example, the rubber compositions contained sunflower oil instead of petroleum based oil.

The Control rubber Sample E and Experimental rubber Sample F compositions are based on the formulation exhibited in Table 1 with selected ingredients shown in the following Table 6.

TABLE 6

| | Parts by Weight (phr) | |
|---|---|---|
| Material | Control Sample E | Experimental Sample F |
| Natural cis 1,4-polyisoprene rubber | 50 | 50 |
| High cis 1,4-polybutadiene rubber | 50 | 0 |
| High vinyl polybutadiene rubber | 0 | 50 |
| Sunflower oil | 50 | 50 |
| Traction promoting resin | 0 | 0 |
| Rubber processing oil (petroleum) | 0 | 0 |

The following Table 7 illustrates various physical properties of Control rubber Sample E and Experimental rubber Sample F. Where cured rubber samples are reported, such as for the stress-strain, hot rebound, tan delta and storage modulus G' values, the rubber samples were cured for about 10 minutes at a temperature of about 170° C.

To establish the predictive wet traction, a tan delta (tan delta) test and rebound test were run at 0° C.

To establish the predictive rolling resistance performance, a tan delta test and rebound test were run at 100° C.

To establish the predictive low temperature (winter snow) performance, the rubber's stiffness test (storage modulus G') was run at −20° C. to provide a stiffness value of the compounds (rubber compositions) at lower operating (lower ambient) temperatures.

TABLE 7

| Properties | Control Sample E | Experimental Sample F |
|---|---|---|
| Wet Traction, Laboratory Prediction | | |
| Tan delta, 1.5% strain, 7.8 Hertz, 0° C. (higher is better) | 0.26 | 0.29 |
| Rebound, 0° C. (%), (lower is better) | 38 | 31 |
| Cold Weather (Winter) Performance (Stiffness) Laboratory Prediction | | |
| Storage modulus (G'), (MPa) at −20° C., 7.8 Hertz, 1.5% strain (lower stiffness values are better) | 5.3 | 5.1 |
| Rolling Resistance (RR) Laboratory Prediction | | |
| Rebound at 100° C., (%), (higher is better) | 60 | 63 |
| Tan delta, 10% strain, 1 Hertz (100° C.) (lower is better) | 0.17 | 0.14 |
| Additional properties | | |
| Tensile strength (MPa) | 17.5 | 16 |
| Elongation at break (%) | 664 | 568 |
| Modulus 300% (MPa) | 6.3 | 6.8 |

(A) for Predictive Wet Traction (Tan Delta and Rebound Properties at 0° C.)

From Table 7 it is observed that the tan delta value at 0° C. of 0.29 for Experimental rubber Sample F containing the high vinyl polybutadiene rubber together with the sunflower oil in place of the petroleum based rubber processing oil is higher than the tan delta value of 0.26 for Control rubber Sample E containing the high cis 1,4-polybutadiene rubber (therefore a low vinyl polybutadiene rubber).

It is also observed that the rebound value at 0° C. of 31 percent for Experimental rubber Sample F is lower than the rebound value at 0° C. of 38 percent for Control rubber Sample E containing the high cis 1,4-polybutadiene rubber.

It is therefore is concluded that it was discovered that replacing the high cis 1,4-polybutadiene rubber (therefore the low vinyl polybutadiene rubber) with the high vinyl polybutadiene rubber for the sunflower oil-containing rubber compositions (instead of petroleum based rubber processing oil) resulted in a beneficially improved (increased) predictive wet traction for a tire with tread comprised of Experimental rubber Sample F.

(B) For Predictive Tire Rolling Resistance (RR) Based on Predictive Rubber Hysteresis (Tan Delta and Rebound Properties at 100° C.)

From Table 7 it is observed that the tan delta value at 100° C. of 0.14 for Experimental rubber Sample F containing the high vinyl polybutadiene rubber together with the sunflower oil is significantly lower than the tan delta value of 0.17 for Control rubber Sample E containing the high cis 1,4-polybutadiene rubber (therefore the low vinyl polybutadiene rubber).

It is also observed that the rebound value at 100° C. of 63 percent for Experimental rubber Sample F containing the high vinyl polybutadiene rubber is higher than the rebound value at 100° C. of 60 percent for Control rubber Sample E containing the high cis 1,4-polybutadiene rubber.

It is therefore concluded that it was discovered that replacing the high cis 1,4-polybutadiene rubber (therefore the low vinyl polybutadiene rubber) with the high vinyl polybutadiene rubber-containing rubber composition, also containing the sunflower oil, resulted in a beneficially improved (reduced) hysteresis for the rubber composition B and an associated predictive improved (reduction) in tire rolling resistance for a tire with tread of rubber composition comprised of rubber composition F with a predictive improved fuel economy for an associated vehicle.

(C) For Predictive Cold Weather Performance (Stiffness at −20° C.)

From Table 7 it is observed that the storage modulus (G') at −20° C. value of 5.1 MPa for Experimental rubber Sample F containing the high vinyl polybutadiene rubber is somewhat lower than the storage modulus (G') of 5.3 MPa for Control rubber Sample E containing the high cis 1,4-polybutadiene rubber (therefore a low vinyl polybutadiene rubber).

It is therefore concluded that it was discovered that replacing the cis 1,4-polybutadiene rubber with the high vinyl polybutadiene rubber-containing rubber composition, also containing the sunflower oil for Experimental rubber Sample F resulted in a beneficial reduction in stiffness for the rubber composition and therefore a somewhat improved (substantially maintained) predictive cold weather performance for a tire with a tread of rubber composition of Sample F.

Summary of Results for Example IV

Experimental rubber Sample F, when compared to Control rubber Sample E, would be predictive of the following tire performance when used as the tread compound: improved wet traction and rolling resistance, with no loss or a slight improvement of (substantially maintained) cold weather performance.

EXAMPLE V

In this Example, exemplary rubber compositions were prepared for evaluation for use as a tire tread to promote a combination of improved wet traction and rolling resistance with a minimum effect on cold weather (winter) performance.

A Control rubber composition was prepared and identified as Control rubber Sample G as a precipitated silica reinforced rubber composition containing elastomers as a combination of natural cis 1,4-polyisoprene rubber and cis 1,4-polybutadiene rubber.

An Experimental rubber composition was prepared and identified as Experimental rubber Sample H containing the natural cis 1,4-polyisoprene rubber together with high vinyl polybutadiene rubber.

For this Example, the rubber compositions contained a combination of sunflower oil (instead of petroleum based oil) and traction promoting resin.

The Control rubber Sample G and Experimental rubber Sample H compositions are based on the formulation exhibited in Table 1 with selected ingredients shown in the following Table 8.

TABLE 8

| | Parts by Weight (phr) | |
|---|---|---|
| Material | Control Sample G | Experimental Sample H |
| Natural cis 1,4-polyisoprene rubber | 50 | 50 |
| High cis 1,4-polybutadiene rubber | 50 | 0 |
| High vinyl polybutadiene rubber | 0 | 50 |
| Sunflower oil | 25 | 25 |
| Traction promoting resin | 25 | 25 |

The following Table 9 illustrates various physical properties of Control rubber Sample G and Experimental rubber Sample H. Where cured rubber samples are reported, such as for the stress-strain, hot rebound, tan delta and storage modulus G' values, the rubber samples were cured for about 10 minutes at a temperature of about 170° C.

To establish the predictive wet traction, a tan delta (tan delta) test and rebound test were run at 0° C.

To establish the predictive rolling resistance performance, a tan delta test and rebound test were run at 100° C.

To establish the predictive low temperature (winter snow) performance, the rubber's stiffness test (storage modulus G') was run at −20° C. to provide a stiffness value of the compounds (rubber compositions) at lower operating (lower ambient) temperatures.

TABLE 9

| Properties | Control Sample G | Experimental Sample H |
|---|---|---|
| Wet Traction, Laboratory Prediction | | |
| Tan delta, 1.5% strain, 7.8 Hertz, 0° C. (higher is better) | 0.32 | 0.4 |
| Rebound, 0° C. (%), (lower is better) | 25 | 13 |
| Cold Weather (Winter) Performance (Stiffness) Laboratory Prediction | | |
| Storage modulus (G'), (MPa) at −20° C., 7.8 Hertz, 1.5% strain (lower stiffness values are better) | 7.2 | 9.8 |
| Rolling Resistance (RR) Laboratory Prediction | | |
| Rebound at 100° C., (%), (higher is better) | 57 | 59 |
| Tan delta, 10% strain, 1 Hertz (100° C.) (lower is better) | 0.18 | 0.14 |
| Additional properties | | |
| Tensile strength (MPa) | 17.8 | 17.1 |
| Elongation at break (%) | 682 | 596 |
| Modulus 300% (MPa) | 6.2 | 6.7 |

(A) for Predictive Wet Traction (Tan Delta and Rebound Properties at 0° C.)

From Table 9 it is observed that the tan delta value at 0° C. of 0.4 for Experimental rubber Sample H containing the high vinyl polybutadiene rubber together with the traction promoting resin and sunflower oil is significantly higher than the tan delta value of 0.32 for Control rubber Sample G containing the high cis 1,4-polybutadiene rubber.

It is also observed that the rebound value at 0° C. of 13 percent for Experimental rubber Sample H is significantly lower than the rebound value at 0° C. of 25 percent for Control rubber Sample G containing the high cis 1,4-polybutadiene rubber.

It is therefore concluded that it was discovered that replacing the high cis 1,4-polybutadiene rubber with the high vinyl polybutadiene rubber for the traction promoting resin and sunflower oil-containing rubber composition resulted in an improved predictive wet traction for a tire with tread comprised of Experimental rubber Sample H.

(B) For Predictive Tire Rolling Resistance (RR) Based on Predictive Rubber Hysteresis (Tan Delta and Rebound Properties at 100° C.)

From Table 9 it is observed that the tan delta value at 100° C. of 0.14 for Experimental rubber Sample H containing the high vinyl polybutadiene rubber together with the traction promoting resin is significantly lower than the tan delta value of 0.18 for Control rubber Sample G containing the high cis 1,4-polybutadiene rubber.

It is also observed that the rebound value at 100° C. of 59 percent for Experimental rubber Sample H containing the high vinyl polybutadiene rubber is higher than the rebound value at 100° C. of 57 percent for Control rubber Sample G containing the high cis 1,4-polybutadiene rubber.

It is therefore concluded that it was discovered that replacing the high cis 1,4-polybutadiene rubber with the high vinyl polybutadiene rubber-containing rubber composition, also containing the traction promoting resin and sunflower oil, resulted in a beneficially improved (reduced) hysteresis for the rubber composition H and an associated predictive improved (reduction) in tire rolling resistance for a tire with tread of rubber composition comprised of rubber composition H with a predictive improved fuel economy for an associated vehicle.

(C) For Predictive Cold Weather Performance (Stiffness at −20° C.)

From Table 9 it is observed that the storage modulus (G') value of 9.8 MPa at −20° C. for Experimental rubber Sample H containing the high vinyl polybutadiene rubber is higher than the storage modulus (G') of 7.2 MPa for Control rubber Sample G containing the high cis 1,4-polybutadiene rubber.

Summary of Results for Example V

Experimental rubber Sample H, when compared to Control rubber Sample G, would be predictive of the following tire performance when used as the tread compound: improved wet traction and rolling resistance, with some loss of cold weather performance.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire having a circumferential rubber tread of a rubber composition comprised of, based on parts by weight per 100 parts by weight elastomer (phr):
    (A) 100 phr of conjugated diene-based elastomers, consisting of (1), (2) and (3)
        (1) about 10 to about 75 phr of a high vinyl polybutadiene rubber having a Tg in a range of from about −40° C. to about −10° C. and an isomeric vinyl 1,2-content in a range of from about 60 to about 85 percent,
        (2) about 90 to about 25 phr of cis 1,4-polyisoprene rubber having a Tg in a range of from about −65° C. to about −75° C. and an isomeric cis 1,4-content of at least 95 percent, and
        (3) up to about 25 phr of at least one of low vinyl polybutadiene elastomer having a vinyl 1,2-content of less than 15 percent having a Tg in a range of −108° C. to about −90° C., and 3,4-polyisoprene;
    (B) about 80 to about 200 phr of rubber reinforcing filler comprised of a combination of precipitated silica and rubber reinforcing carbon black in a ratio of precipitated silica to rubber reinforcing carbon black of at least 9/1, together with silica coupling agent having a moiety reactive with hydroxyl groups on said precipitated silica and another different moiety interactive with said diene-based elastomers, and
    (C) about 10 to about 60 phr of at least one additive comprised of at least one of
        (1) traction promoting resin,
        (2) petroleum based rubber processing oil, and
        (3) vegetable triglyceride rubber processing oil selected from the group consisting of sunflower, soybean, canola and safflower oil;
wherein the rubber composition is exclusive of synthetic copolymer based elastomers.

2. The tire of claim 1 wherein said high vinyl polybutadiene is a functionalized high vinyl polybutadiene elastomer comprised of a high vinyl polybutadiene elastomer which contains at least one end-chain functional group reactive with hydroxyl groups on said precipitated silica comprised of at least one of amine, thiol, siloxy and silane-sulfur groups.

3. The tire of claim 1 wherein said precipitated silica and silica coupling agent are provided as a composite of precipitated silica pre-reacted with silica coupling agent.

4. The tire of claim 1 wherein said precipitated silica and silica coupling agent are added to the rubber composition and reacted together in situ within the rubber composition.

5. The tire of claim 1 wherein said silica coupling agent is comprised of:
    (A) bis(3-trialkoxysilylalkyl) polysulfide containing an average in range of from about 2 to about 4 connecting sulfur atoms in its polysulfidic bridge, or
    (B) an organoalkoxymercaptosilane, or
    (C) their combination.

6. The tire of claim 5 wherein said silica coupling agent is comprised of a bis(3-triethoxysilylpropyl) polysulfide.

7. The tire of claim 1 wherein said silica coupling agent is comprised of an organoalkoxymercaptosilane.

8. The tire of claim 1 wherein said traction promoting resin is comprised of a styrene/alphamethylstyrene resin having a styrene content in a range of from about 10 to about 90 percent and a softening point within a range of from about 60° C. to about 125° C.

9. The tire of claim 1 wherein said traction promoting resin is comprised of a coumarone-indene resin having a softening point within a range of from about 60° C. to about 150° C.

10. The tire of claim 1 wherein said traction promoting resin is comprised of a petroleum hydrocarbon resin.

11. The tire of claim 1 wherein said traction resin is comprised of a terpene resin.

12. The tire of claim 11 wherein said terpene resin is a polymer comprised of at least one of limonene, alpha pinene, beta pinene and delta-3-carene and having a softening point in a range of from about 60° C. to about 160° C.

13. The tire of claim 1 wherein said traction promoting resin is comprised of terpene-phenol resin.

14. The tire of claim 1 wherein said additive is a combination of traction promoting resin, petroleum based rubber processing oil and vegetable triglyceride oil.

15. The tire of claim 1 wherein said additive is a combination of traction promoting resin and vegetable triglyceride oil.

16. The tire of claim 1 wherein said additive is a combination of traction promoting resin and petroleum based rubber processing oil.

17. The tire of claim 1 wherein said rubber processing oil of said additive is a combination of petroleum based rubber processing oil and vegetable triglyceride oil.

18. The tire of claim 1 wherein said tread rubber composition is a sulfur cured rubber composition.

* * * * *